United States Patent
Pindoria et al.

(10) Patent No.: US 8,468,185 B2
(45) Date of Patent: Jun. 18, 2013

(54) DATA PROCESSING METHOD AND APPARATUS HAVING INPUT SAMPLE VALUES AND APPLYING A FILTER TO LIMIT AN OUTPUT VALUE RANGE TO BE WITHIN A PERMISSIBLE RANGE

(75) Inventors: Manish Devshi Pindoria, Middlesex (GB); Karl James Sharman, Eastleigh (GB)

(73) Assignee: Sony United Kingdom Limited, Weybridge (GB)

( * ) Notice: Subject to any disclaimer, the term of this patent is extended or adjusted under 35 U.S.C. 154(b) by 929 days.

(21) Appl. No.: 12/572,784

(22) Filed: Oct. 2, 2009

(65) Prior Publication Data

US 2010/0115015 A1    May 6, 2010

(30) Foreign Application Priority Data

Nov. 5, 2008   (GB) .................................. 0820254.1

(51) Int. Cl.
  *G06T 5/20*   (2006.01)
  *G06F 17/10*   (2006.01)

(52) U.S. Cl.
  USPC ........... 708/207; 708/208; 708/209; 382/266; 382/300

(58) Field of Classification Search
  USPC .......................... 708/207–209; 382/266, 300
  See application file for complete search history.

(56) References Cited

U.S. PATENT DOCUMENTS

| | | | | |
|---|---|---|---|---|
| 5,910,751 | A * | 6/1999 | Winn et al. | 327/560 |
| 6,148,116 | A * | 11/2000 | Park et al. | 382/266 |
| 7,152,081 | B2 * | 12/2006 | Gremmert | 708/300 |
| 7,756,361 | B2 * | 7/2010 | Hong | 382/300 |

FOREIGN PATENT DOCUMENTS

WO   WO 2007/036853 A2   4/2007

* cited by examiner

*Primary Examiner* — Tammara Peyton
(74) *Attorney, Agent, or Firm* — Oblon, Spivak, McClelland, Maier & Neustadt, L.L.P.

(57) ABSTRACT

A method of data processing. The method comprises applying a filter to an input sample set comprising sample values selected from an input sequence of input sample values, so as to generate a corresponding output sample value having an output sample value position with respect to the input sample set, in which the filter has a maximum output range. The method further comprises deriving a permissible output value range from an input group of two or more input sample values in the input sample set which surround the output sample value position, detecting whether the output of the filter is outside the permissible output value range and, if so, limiting the output of the filter to lie within the permissible output value range.

19 Claims, 12 Drawing Sheets

700   705

| 0 | 1 | 1 |
|---|---|---|
| 0 | 1 | 1 |
| 0 | 1 | 0 |

FIG. 11A

| 0 | 0 | 0 |
|---|---|---|
| 1 | 1 | 1 |
| 0 | 1 | 0 |

FIG. 11B

| 1 | 0 | 1 |
|---|---|---|
| 0 | 0 | 0 |
| 0 | 1 | 0 |

FIG. 11C

| 1 | 0 | 1 |
|---|---|---|
| 0 | 0 | 0 |
| 1 | 0 | 1 |

FIG. 11D

DATA PROCESSING METHOD AND APPARATUS HAVING INPUT SAMPLE VALUES AND APPLYING A FILTER TO LIMIT AN OUTPUT VALUE RANGE TO BE WITHIN A PERMISSIBLE RANGE

BACKGROUND OF THE INVENTION

1. Field of the Invention

The present invention relates to a data processing method and apparatus.

2. Description of the Prior Art

Recently, digital display screens such as liquid crystal displays (LCD) have become increasingly popular for viewing broadcast media content such as television programmes and films. Additionally, such displays may be used to view pre-recorded media content stored on a storage medium such as DVD-ROM or Blu-ray® disc. Digital displays typically display images using a progressive scanning method in which scan lines of image pixels are displayed sequentially on the display.

However, broadcast media content is typically broadcast in an interlaced format for display on analogue displays such as CRT (Cathode Ray Tube) displays. Analogue displays typically use an interlaced scanning method in which odd and even lines of image pixels are displayed consecutively.

In order to display the media content on a digital display, such as an LCD, the interlaced media content may need to be interpolated so as to generate interpolated pixels for display between the odd and even lines respectively. Additionally, where the media content has a different image resolution from that of the display on which the content is to be displayed, image interpolation may need to be carried out so as to generate a scaled image.

For example, where a television programme is broadcast in standard definition (SD) and is to be displayed on a high definition (HD) display, image interpolation can be carried out between input pixels of the standard definition television programme so as to generate output pixels for display in the high definition format. Alternatively, where content to be displayed has a higher resolution than the display on which the content is to be displayed, decimation of pixels may be carried out so as to shrink the image for display at the lower resolution.

There are several known methods for carrying out image interpolation. However, some types of image may cause image artefacts to be produced when using known interpolation methods. One such type of image is one comprising a discontinuity in pixel value. For example, a discontinuity may be where there is a sudden transition from a black pixel to a white pixel.

In a known method of image interpolation, a bi-cubic filter is applied to input pixels so as to generate the interpolated pixels. However, bi-cubic filters are unsuitable for performing image scaling operations, especially shrinking operations, as bi-cubic filters perform a decimation operation rather than a filtering operation. This may be addressed by using a sinc filter to generate the interpolated pixels so that both image shrinking and expanding operations can be performed.

However, in some cases, the use of a sinc filter may cause an image artefact termed ringing to become apparent in the output image. Ringing typically occurs where there is a discontinuity in the image such as that corresponding to the edge of an object. A sinc filter is a slowly decaying periodic filter and, consequently, when the filter is applied to source pixels, the filter characteristics may become visible in the output image. Accordingly, ringing may manifest itself in the output image as a series of periodic image features near the discontinuity. A detailed example of ringing will be described in more detail later. Although this problem may be reduced by using different length sinc filters or windowed filters, ringing may still be apparent in the output image.

US-A-2005/0286804 discloses a method of image interpolation for reducing ringing when using a sinc filter to generate interpolated source pixels by detecting frequencies in the source pixels and carrying out a weighted clip of the filter output if a high frequency is detected in the source pixels. However, this system may not work well when shrinking an image, and may only reduce ringing in some images.

Although a sinc filter can be used to perform image scaling, the use of a sinc filter to generate interpolated pixels may lead to the appearance of image artefacts in the form of ringing in the output image.

SUMMARY OF THE INVENTION

The present invention seeks to mitigate and alleviate the above problems.

An object of the present invention is to provide an improved data processing method and apparatus.

In a first aspect, there is provided a method of data processing, the method comprising: applying a filter to an input sample set comprising sample values selected from an input sequence of input sample values, so as to generate a corresponding output sample value having an output sample value position with respect to the input sample set, the filter having a maximum output range; deriving a permissible output value range from an input group of two or more input sample values in the input sample set which surround the output sample value position; detecting whether the output of the filter is outside the permissible output value range and, if so, limiting the output of the filter to lie within the permissible output value range.

In a second aspect, there is provided an apparatus for data processing, said apparatus comprising: a filtering element operable to apply a filter to an input sample set comprising sample values selected from an input sequence of input sample values, so as to generate a corresponding output sample value having an output sample value position with respect to said input sample set, said filter having a maximum output range; a deriver operable to derive a permissible output value range from an input group of two or more input sample values in said input sample set which surround said output sample value position; a detector operable to detect whether said output of said filter is outside said permissible output value range; and a limiter operable to limit said output of said filter to lie within said permissible output value range if said detector detects that said output of said filter is outside said permissible output value range.

By deriving a permissible output value range from an input group of two or more input sample values in the input sample set which surround the output sample value position and limiting the output of the filter to lie within the permissible output value range if the detector detects that the output of the filter is outside the permissible output value range, image artefacts in the form of ringing in the output image can advantageously be reduced in an elegant way without requiring the use of large processing resources.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIGS. 11A, 11B, 11C, and 11D are schematic diagrams of an indication of whether pixel values of pixels surrounding an interpolated pixel have been limited to lie within a permissible output value range in accordance with an embodiment of the present invention;

DESCRIPTION OF THE PREFERRED EMBODIMENTS

Although illustrative embodiments of the invention have been described in detail herein with respect to the accompanying drawings, it is to be understood that the invention is not limited to those precise embodiments, and that various changes and modifications can be effected therein by one skilled in the art without departing from the scope and spirit of the invention as defined by the appended claims.

A data processing method and apparatus is disclosed. In the following description, a number of specific details are presented in order to provide a thorough understanding of embodiments of the present invention. It will be apparent, however, to a person skilled in the art that these specific details need not be employed to practise the present invention. Conversely, specific details known to the person skilled in the art are omitted for the purposes of clarity in presenting the embodiments.

Figure 1:
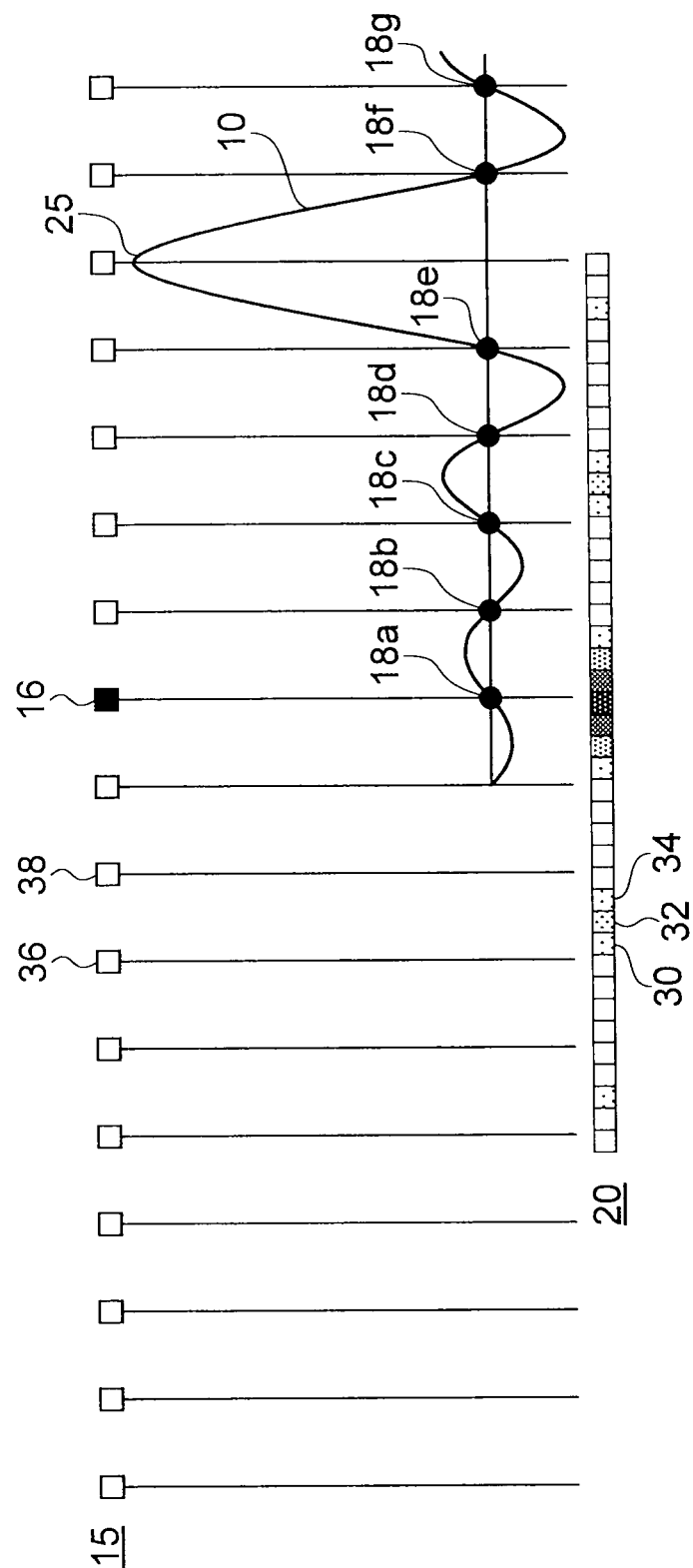
FIG. 1 is a schematic diagram of ringing in a sequence of output pixels when a sinc filter is applied to a sequence of input pixels comprising an impulse.

An example of ringing will now be described with reference to FIG. 1. FIG. 1 shows an eleven tap, digital sinc filter characteristic 10 which has been applied to a plurality of source pixels 15 having pixel values in the range 0 and 255 represented in an 8-bit representation. In the example shown in FIG. 1, source pixels having a pixel value of zero are shown in white, whilst source pixel 16 has a source pixel value of 255 and is shaded in black. It will be appreciated that in the example shown in FIG. 1, the usual convention of white taking a value of 255 and black having a value of 0 has been reversed so as to improve the clarity of the drawing. The filter characteristic 10 has been applied to the source pixels 15 so as to generate output pixels 20. In the example shown in FIG. 1, 4 output pixels have been generated for every source pixel. In other words, the source pixels 15 have been zoomed by a factor of 4 to generate the output pixels 20.

It will be appreciated that other suitable pixel value ranges may be used to represent the pixel value such as 16-bit or 32-bit representations of pixel value range. Additionally, it will be appreciated that the pixel values need not be limited to a monochromatic colour space but that each source pixel and output pixel may be represented in a suitable colour space such as RGB (Red Green Blue), CMYK (Cyan Magenta Yellow Key), YCbCr (component video), HSV (Hue Saturation Value) and the like.

To generate each output pixel, a source value of each source pixel is multiplied by a filter coefficient of the filter at each tap position as indicated by the circular dots 18a-18g. The resultant products are then summed together so as to produce an output pixel value at a centre position 25 of the filter characteristic 10. This process is repeated for each output pixel position. For the sake of understanding the drawing, it will be appreciated that three taps have been omitted from the right hand side of FIG. 1. In other words, as mentioned above, the filter characteristic 10 shown in FIG. 1 comprises eleven taps and is symmetrical about the centre position 25 of the filter characteristic 10. As will be appreciated, the taps which are not illustrated in FIG. 1 correspond to the taps 18a, 18b, and 18c reflected about the centre position 25. Additionally, it will be appreciated that although an eleven tap sinc filter has been illustrated, any other suitable number of taps could be used.

However, at some filter positions, where the centre position 25 lies between two source pixels having a value of zero, the output of the filter may be non zero. This will occur if there is a non zero filter coefficient at a position corresponding to a source pixel having a non-zero pixel value, such as the source pixel 16. For example, output pixels 30, 32, and 34 should have a pixel value of zero so that they appear similar to the surrounding source pixels such as source pixels 36 and 38. However, because there is a non-zero product due to the pixel value of the source pixel 16 being multiplied by a non-zero filter tap value in the sum of products, the output pixels 30, 32, and 34 have non-zero pixel values and appear grey. Therefore, it can be seen that the filter characteristics have become apparent in the output pixels 20. This manifestation of filter characteristics in the output pixels 20 is an example of ringing.

To address this problem, embodiments of the present invention limit the output of the filter to within a permissible output value range. The permissible output value range is illustrated with respect to FIG. 2.

Figure 2:
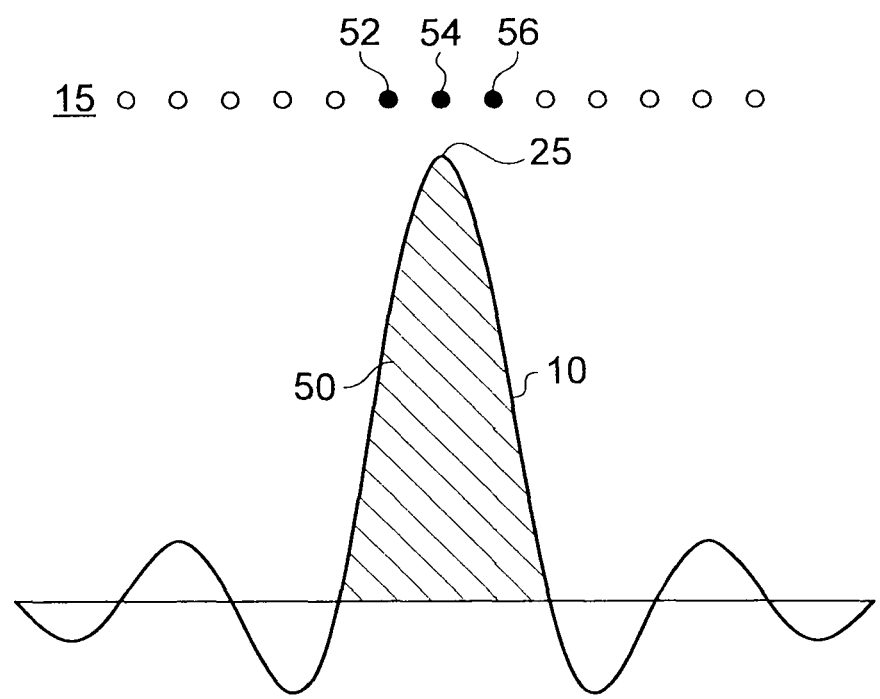
FIG. 2 is a schematic diagram of source pixels from which a permissible output value range may be derived in accordance with an embodiment of the present invention.

FIG. 2 shows the filter characteristic 10 arranged with respect to the source pixels 15. The filter characteristic 10 comprises a central lobe 50 (diagonal shading) which is bounded by the envelope of filter coefficients about the centre position 25 and the x-axis. The permissible value output range comprises a maximum value MAX_VAL, which defines an upper limit of the permissible output value range, and a minimum value MIN_VAL, which defines a lower limit of the permissible output value range. Preferably, the maximum and minimum value of the permissible output value range are derived from source pixels which correspond to positions within the central lobe 50 of the filter characteristic 10. In the embodiment shown in FIG. 2, source pixels 52, 54, and 56 are covered by the central lobe 50. Accordingly, the source pixels 52, 54, and 56 form an input group of source pixels which surround an output pixel position corresponding to the centre position 25 of the filter characteristic 10.

In an embodiment, the maximum and minimum pixel values of the source pixels 52, 54, and 56 within the central lobe, considered as a group, are detected so as to derive a source pixel value range. The permissible output value range is then set to correspond to the source pixel value range.

In order to reduce or suppress ringing in the output image, embodiments of the present invention detect whether the output of the filter is outside the permissible output value range. If it is detected that this is the case, then the output of the filter is limited to lie within the permissible output value range. In other words, the output of the filter is limited to lie within the range MIN_VAL≦output≦MAX_VAL. In a particular example, if the filter output is greater than MAX_VAL it can be set to equal MAX_VAL. Similarly, in the example, if the filter output is less than MIN_VAL it can be set to equal MIN_VAL. This advantageously reduces a likelihood that the interpolated output pixel has a pixel value which is outside that of the pixel values of the source pixels in the central lobe 25. Therefore, the pixel value of the interpolated output pixel is more likely to correspond generally to those of the source pixels near to the output pixel. Although a test group of 3 pixels has been illustrated in FIG. 2, it will be appreciated that any input group of 2 or more source pixels may be used to derive the permissible output value range.

A method of implementing embodiments of the present invention will now be described with reference to the flowchart of FIG. 3.

At a step S100, the source pixels are input to the filter as an input sequence of input sample values. As described above, source pixels are multiplied by the corresponding filter tap values at the source pixel positions and the resultant values summed together so as to generate an output pixel value. In the case of a sinc filter, the output pixel value is generated at a position corresponding to the centre position 25 of the filter. Then, at a step S110 the permissible output value range is derived from those source pixels surrounding the output pixel position. Referring back to FIG. 2, it can be seen that the source pixels 52, 54, and 56 surround the centre position 25 of the filter characteristic 10 and thus surround the output position of the output pixel. However, it will be understood that the term "surround" refers in this example to those source pixels whose positions correspond to the centre lobe 50 and not necessarily just those source pixels that are adjacent to the output pixel position.

At a step S120, it is detected whether the output of the filter is outside the permissible output value range. If the output of the filter does lie within the permissible output value range, then, at a step S130, the output pixel is generated accordingly by summing the products of the filter coefficients at the source pixel positions with the pixel values of the source pixels at the source pixel positions. An example of a situation in which the output of the filter lies within the permissible output value range is when the centre position 25 of the filter corresponds to the source pixel 16 shown in FIG. 1.

However, if, at the step S120, the output of the filter is detected to be outside the permissible output value range then, at a step S140, the output of the filter is set to lie within the permissible output value range. The output pixel is then generated accordingly at the step S130 as described above.

With reference to the example shown in FIG. 1, an instance of a pixel outside the permissible output value range may occur when the centre position 25 of the filter characteristic 10 corresponds to the output pixel position of the output pixel 32. In this case, the source pixels 36 and 38 correspond to positions within the central lobe 50 of the filter characteristic 10. However, the source pixels 36 and 38 have a pixel value of zero and therefore MIN_VAL and MAX_VAL are each set to zero. The output of the filter is then limited to lie within this range i.e. the output of the filter is set to zero. Therefore, instead of the output pixel 32 having a non-zero pixel value, which would be seen as ringing in the output image, the output pixel of the output pixel 32 will be zero and the appearance of filter characteristics in the output pixels will be reduced.

However, in some embodiments, it is advantageous to set the permissible output value range to be greater than the input pixel value range, subject to a maximum output range of the filter. For example, this may occur where a sequence of input pixels exhibits a greater degree of non-linearity of pixel value than a non-linearity threshold amount. By allowing an interpolated pixel to take a pixel value that is outside the input pixel value range, as defined with respect the central lobe 50 of the filter characteristic 10, the overall image quality may be improved. In some embodiments, the non-linearity threshold amount is such that, if a degree of non-linearity of pixel value is greater than the non-linearity threshold amount, the sequence of input pixels can be said to exhibit a non-monotonic variation of pixel value. However, it will be appreciated that any other suitable non-linearity threshold amount could be used. This will be described in more detail below.

To facilitate this, embodiments of the present invention detect whether a test group of source pixels selected from the input group of pixel values (those source pixels corresponding to the central lobe 50 of the filter characteristic 10) exhibit a degree of non-linearity in pixel value which is greater than the non-linearity threshold amount. The permissible output value range is then set accordingly. In other words, the output pixel may be allowed to take a pixel value that is greater than the pixel values in the input pixel value range (overshoot) or less than the pixel values in the input pixel value range (undershoot), subject to an overall maximum or minimum output value of the filter. The maximum and minimum output values of the filter define a maximum output range of the filter (e.g. 0 to 255 in the example 8 bit system).

In an embodiment, the test group is selected from the input group of source pixels as corresponding to a predetermined number of source pixels surrounding the centre point 25 of the filter characteristic 10. Preferably, the test group comprises three source pixels. In an embodiment, the test group is selected to comprise two source pixels preceding the output pixel position and one source pixel following the output pixel position in the input sequence of input sample values. However, it will be appreciated that one source pixel preceding the output pixel position and two source pixels following the output pixel position in the sequence of input sample values could be selected to comprise the test group. Additionally, it will be appreciated that any other suitable method for selecting a suitably sized test group could be used.

The modification of the permissible output value range previously derived as described above in dependence upon a detection of a test group of pixel values which exhibit a greater degree of non-linearity than the non-linearity threshold amount will now be described in more detail with reference to FIGS. 4 to 6.

Figure 4:
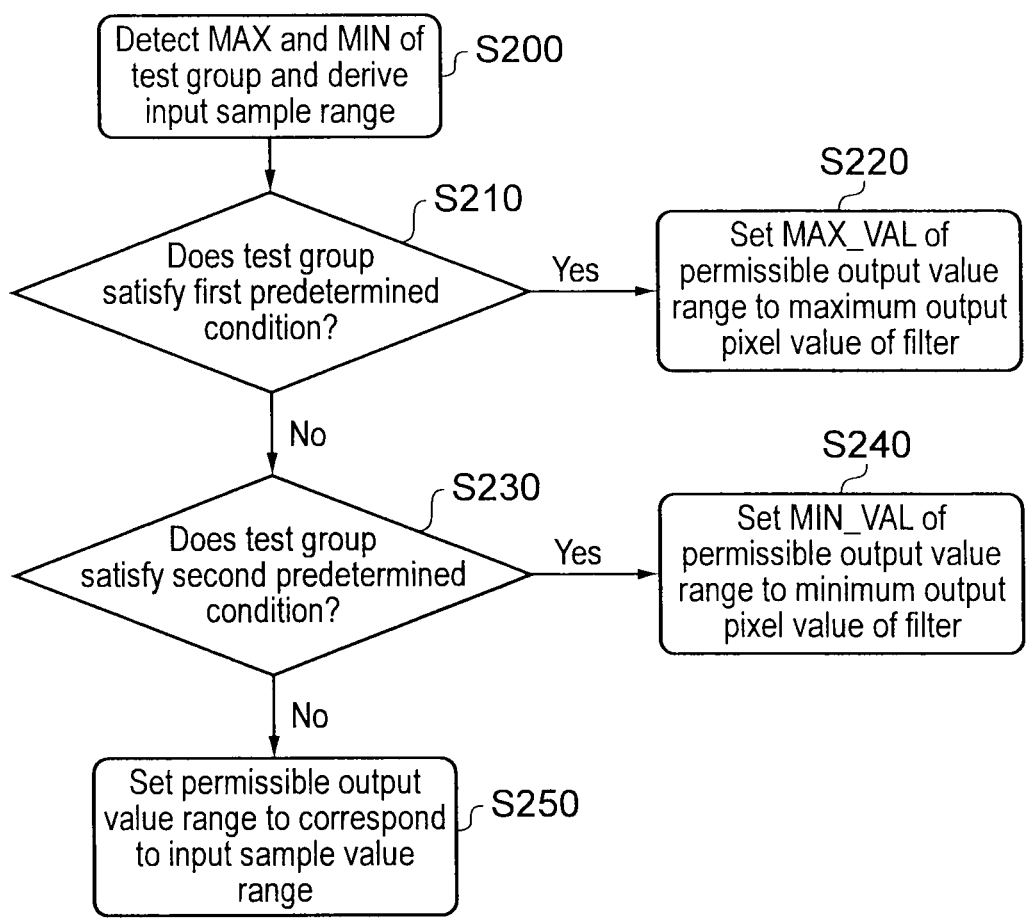
FIG. 4 is a flowchart of a method of deriving a permissible output value range in accordance with an embodiment of the present invention.

FIG. 4 shows a flowchart of a method of setting the permissible output value range in dependence upon a detection of whether the test group of source pixels exhibits a greater degree of non-linearity in pixel value than the non-linearity threshold amount (i.e. whether the test group exhibits a significant degree of non-linearity in pixel value).

At a step S200, a maximum pixel value and a minimum pixel value are detected from the test group of source pixels as described above. In the case where the source pixels and output pixels have pixel values such that the pixels are represented in a colour space such as RGB, the maximum and minimum pixel values are detected for each pixel value component (e.g. Red, Green, and Blue). As described above, the test group of source pixels comprises source pixels selected from the input group whose positions correspond to the central lobe 50 of the filter characteristic 10. The input pixel value range is then defined as being between the detected maximum and minimum pixel values in the test group. Where there are several pixel value components such as with a RGB colour space, each component will have a respective input pixel value range for that component which is defined as being between the detected maximum and minimum pixel value in the test group for that colour component.

At the step S200, the permissible output value range is set to correspond to the input sample value range. The limits of the permissible output value range MAX_VAL and MIN_VAL may then be modified at a step S220 or a step S240 in accordance with a detection at a step S210 and S230 as to whether the test group satisfies a first or a second predetermined condition. If the test group is detected as exhibiting a greater degree of non-linearity in pixel value than the non-linearity threshold amount, (i.e. either the first predetermined condition or the second predetermined condition is satisfied), then the permissible output value range is not modified. These steps will be described in more detail below.

If either of the steps S210 and S230 reveal that the test group of source pixels exhibits a greater degree of non-linearity in pixel value than the non-linearity threshold amount, embodiments of the invention allow the permissible output value range to be set so that it is greater than the source pixel input range, subject to the maximum output range of the filter. As mentioned above, this may improve a perceived output quality of the output image. For example, where the input image comprises a periodic image feature such as that corresponding to ripples on a pond, limiting the output of the filter to lie within the input pixel value range as defined by the central lobe of the filter may cause some of the detail of the source image to be obscured in the output image. Therefore, allowing the interpolated pixel value to take a pixel value that is outside the source pixel input range may prevent this detail being lost or degraded.

In order to set MAX_VAL and MIN_VAL of the permissible output value range to appropriate values, at a step S210, embodiments of the present invention detect whether the test group of source pixels satisfies the first predetermined condition. In some embodiments, it is detected whether an average pixel value of the test group is significantly less than a proximate pixel value so as to detect a degree of non-linearity of the pixel values in the test group. Here, the "proximate" pixel value is taken to mean the pixel value of a source pixel nearest to the output sample value position. In other words, if the average pixel value of the test group is less than the proximate pixel value by an overshoot threshold amount (adjustment), then the test group can be said to exhibit a greater degree of non-linearity than the non-linearity threshold amount and the first predetermined condition can be said to be satisfied. Typically, the overshoot threshold amount is such that a non-monotonic variation in pixel value will correspond to a situation in which the degree of non-linearity of the test group is greater than the non-linearity threshold amount. However, it will be appreciated that the overshoot threshold value could be any suitable value.

Where there are two source pixels equidistant from the output sample value position, the proximate pixel value is selected by convention to correspond to a source pixel immediately preceding the output sample value position in the input sequence of input sample values. However, it will be appreciated that a source pixel immediately following the output sample value position in the input sequence of input sample values could be selected as the proximate pixel, the proximate pixel value could be selected from an arbitrary selection of the source pixel preceding or following the output sample value position in the input sequence of input sample values, or any other suitable method for selecting the proximate pixel value could be used.

As mentioned above, in an embodiment, the test group comprises three source pixels. This advantageously reduces processing resources below those which would be required if more source pixels were processed, whilst still allowing the permissible output value range to be set such that the interpolated pixel may take a pixel value that is greater than the input pixel value range. Where an interpolated pixel is equidistant between two source pixels, and the test group comprises three source pixels, the proximate pixel value is selected as the centre source pixel from the group of three source pixels. However, it will be appreciated that other suitable methods of selecting the proximate pixel value may be used.

Figure 5:
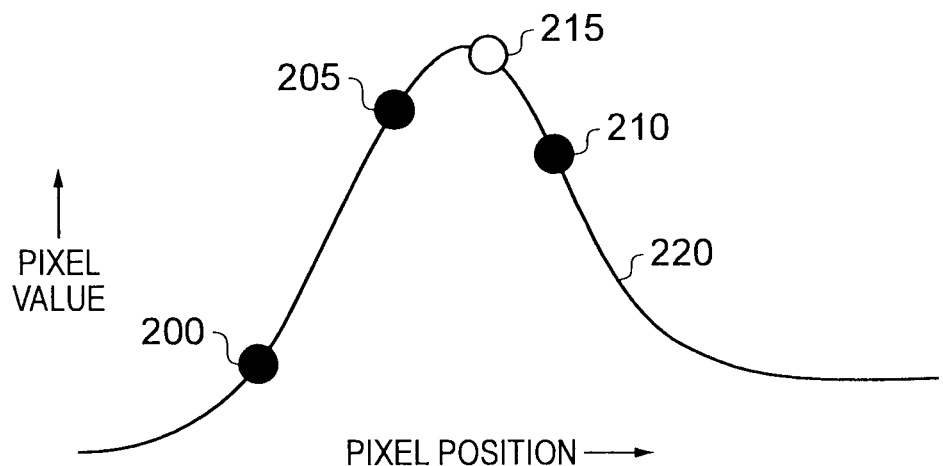
FIG. 5 is a schematic diagram of an interpolated pixel with respect to source pixels exhibiting a degree of non-linearity which is greater than a non-linearity threshold amount in accordance with an embodiment of the present invention.

An example of where the average pixel value of the test group is less than the proximate pixel value is shown in FIG. 5.

FIG. 5 shows source pixels 200, 205, and 210 together with an interpolated output pixel 215. Pixel position, corresponding to the sequence of input sample values, is plotted on the X axis, and pixel value is plotted on the Y axis. In the example shown in FIG. 5, it can be seen that the pixel values of the source pixels 200, 205, and 210 exhibit a degree of non-linearity such that the pixel values of the source pixels exhibit a non-monotonic variation in pixel value, which in this schematic example is taken to mean that the degree of non-linearity is greater than the threshold amount. Here, the input pixel value range is detected to be between the pixel values of the source pixel 200 and the source pixel 205. The pixel values of the source pixels exhibit a non-monotonic variation in pixel value and in this example the degree of non-linearity of the source pixels is assumed to be greater than the threshold amount. Therefore, the interpolated output pixel 215 is allowed to take a pixel value that lies outside the input pixel value range. Although the interpolated output pixel 215 is equidistant between the source pixels 205 and 210, the proximate pixel value is selected to correspond to the source pixel 205 because the source pixel 205 is the centre source pixel of the test group.

Figure 6:
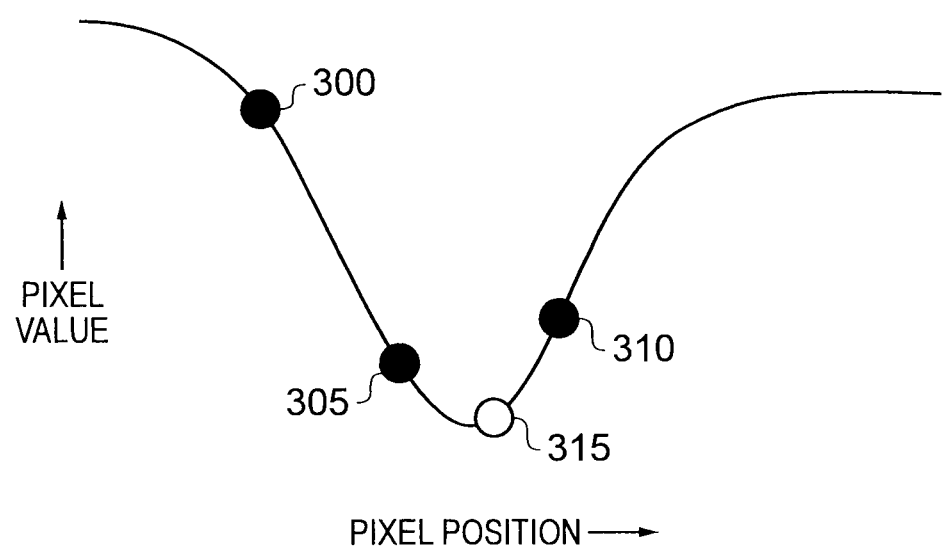
FIG. 6 is a schematic diagram of an interpolated pixel value with respect to source pixels exhibiting a degree of non-linearity which is greater than a non-linearity threshold amount in accordance with an embodiment of the present invention.

In an embodiment, at the step S210, it is detected whether the pixel values of the source pixels shown in the example of FIG. 6 satisfy the following equation.

$$\frac{a+c}{2} \le b - \text{adjustment} \quad \text{equation 1}$$

Here, a is the pixel value of the source pixel 200, b is the pixel value of the source pixel 205 (the proximate pixel value), c is the pixel value of the source pixel 210, where adjustment=q×range+p and range=Max(a,b,c)−Min(a,b,c). In other words, the value range is set to correspond to the absolute pixel value range of the pixels in the test group. Here, q and p are positive constants. In embodiments of the invention, p is typically set to be 200, and q is set to be 0. However, it will be appreciated that any other suitable values of p and q could be used.

Figure 3:
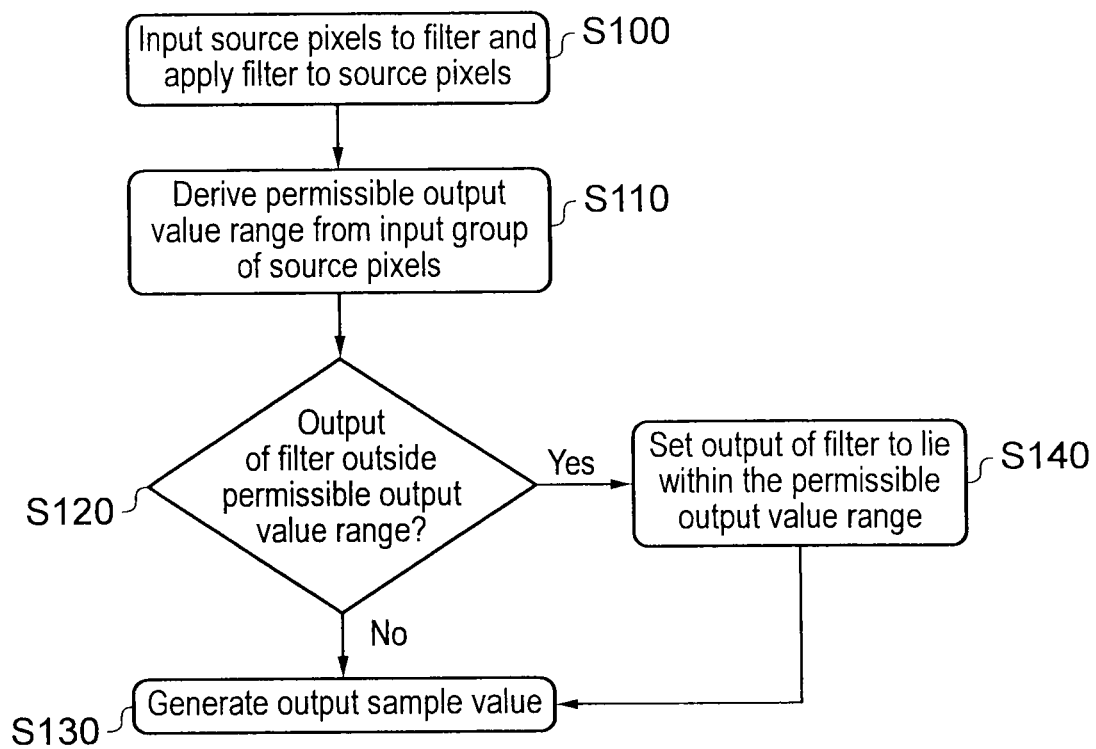
FIG. 3 is a flowchart showing a method of data processing in accordance with an embodiment of the present invention.

If equation 1 is satisfied, then, at a step S220, MAX_VAL is modified from the value set at the step S200 so as to correspond to the maximum output pixel value of the filter (i.e. 255 in the present example), whilst the value of MIN_VAL is unchanged from that derived at the step S110 with reference to FIG. 3 as described above. This advantageously allows the pixel value of the interpolated output pixel 215 to take a pixel value that lies outside the input pixel value range. Accordingly, the pixel value of the interpolated output pixel 215 may be output so as to follow the trend in pixel values in the test group as shown by the solid line 220 in FIG. 5, or follow a trend in pixel values elsewhere in the input image.

In an alternative embodiment, the detection at the step S210 of whether the average pixel value of the test group is less than the proximate pixel value comprises detecting whether the pixel values in the test group satisfy the following equation:

$$\frac{a+c}{2} \le b - ri \quad \text{equation 2}$$

Here, a, b, and c are defined as before, i is the pixel value of the interpolated output pixel 215 before the output of the filter is limited, and r is a positive constant. Typically, r is set to be 0.05, although it will be appreciated that any other suitable positive number may be used.

Returning now to FIG. 4, if at the step S210 it is detected that the average pixel value of the test group is not less than the proximate pixel value by the overshoot threshold amount (i.e. the test group does not satisfy the first predetermined condition), then, at a step S230, it is detected whether the test group satisfies the second predetermined condition. In embodiments of the present invention, the second predetermined condition can be said to be satisfied if the average pixel value of the test group is greater than the proximate pixel value by an undershoot threshold amount ("adjustment"). In other words, if the average pixel value of the test group is greater than the proximate pixel value by an undershoot threshold amount, the test group can be said to exhibit a greater degree of non-linearity than the non-linearity threshold amount (a significant degree of non-linearity), and the second predetermined condition can be said to be satisfied.

Typically, the undershoot threshold amount is such that a non-monotonic variation in pixel value will correspond to a situation in which the degree of non-linearity of the test group is greater than the non-linearity threshold amount, although it will be appreciated that any other suitable undershoot threshold value could be used.

An example of an occurrence in which the average pixel value of the test group is greater than the proximate pixel value is shown in FIG. 6.

FIG. 6 shows source pixels 300, 305, and 310 together with an interpolated output pixel 315. Here, pixel position corresponding to the sequence of input sample values is plotted on the X axis and pixel value is plotted in the Y direction. In the example shown in FIG. 6, the proximate pixel value is selected so as to correspond to the pixel value of the source pixel 305.

In an embodiment, at the step S230 it is detected whether the pixel values of the source pixels satisfy the following equation:

$$\frac{a+c}{2} \ge b + \text{adjustment} \quad \text{equation 3}$$

With reference to FIG. 6, a is the pixel value of the source pixel 300, b is the pixel value of the source pixel 305, and c is the pixel value of the source pixel 310. In other words, a, b, and c correspond to the pixel values of the left, centre, and right source pixels in the test groups as shown, for example, in FIGS. 5 and 6, where the centre source pixel is taken to refer to the pixel defined as having the proximate pixel value, and left and right source pixels are taken to refer to the source pixels respectively preceding and following the source pixel having the proximate pixel value in the input sequence of source pixel values. Here, adjustment is defined in the same way as for Equation 1 above, although it is not required that adjustment, or the specific values of q and p, are the same for the two cases.

In an alternative embodiment, it is detected whether the pixel values of the source pixels satisfies the following equation:

$$\frac{a+c}{2} \ge b + ri \quad \text{equation 4}$$

Here, r and i are defined as before with respect to FIG. 5 with i being the pixel value of the interpolated output pixel.

If, at the step S230, it is detected that the average pixel value of the test group is greater than the proximate pixel value by the undershoot threshold amount then, at a step S240, MIN_VAL of the permissible output value range is modified from that set at the step S200 so as to correspond to the minimum output pixel value of the filter (i.e. 0 in the present example). The value of MAX_VAL will be unchanged from the value derived at the step S110 with reference to FIG. 3 as described above.

However, if at the step S230, it is detected that the average pixel value of the test group is not greater than the proximate pixel value by the undershoot threshold amount (i.e. the second predetermined condition is not satisfied) then, at a step S250, the permissible output value range is not modified and therefore the permissible output value range corresponds to that set at the step S200. In other words, if neither of the conditions tested at the steps S210 and S230 are satisfied, then the sequence of source pixels in the test group is assumed to exhibit a degree of non-linearity which is less than the non-linearity threshold amount. The steps S210 and S230 together therefore constitute a test as to whether the sequence of source pixels in the test group exhibits a degree of non-linearity which is greater than the non-linearity threshold amount.

It will be appreciated that the steps S210 and S230 need not be performed in the order described above and that the step S230 could be carried out before the step S210. In some embodiments, the value of adjustment can be set to zero (on either or both of the two tests).

Accordingly, to detect whether the whether the sequence of source pixels in the test group exhibits a degree of non-linearity which is greater than the non-linearity threshold amount, embodiments detect whether the source pixels in the test group satisfy the first predetermined condition or the second predetermined condition. If neither condition is satisfied, then the sequence of source pixels in the test group is detected to exhibit a degree of non-linearity which is less than the non-linearity threshold amount (a non-significant degree of non-linearity). In the embodiments described above, the first predetermined condition corresponds to that defined in equation 1 or equation 2 above, whilst the second predetermined condition corresponds to that defined in equation 3 or equation 4 above.

Figure 7:
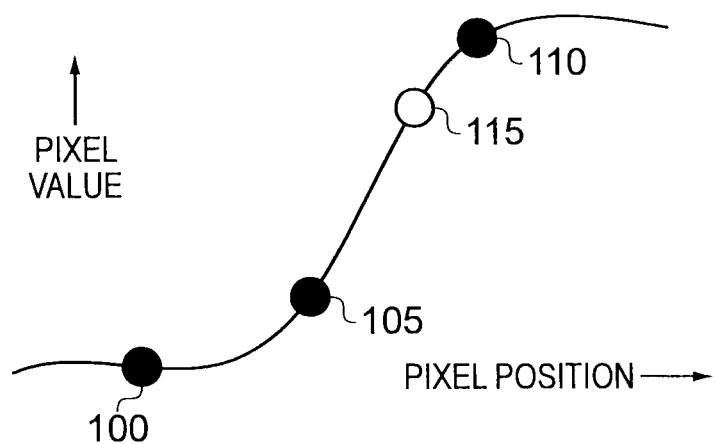
FIG. 7 is a schematic diagram of an interpolated pixel with respect to source pixels exhibiting a degree of non-linearity which is less than a non-linearity threshold amount in accordance with an embodiment of the present invention.

An example of a test group of pixels which do not exhibit a a significant degree of non-linearity is shown in FIG. 7.

FIG. 7 is a schematic diagram of an interpolated pixel together with a test group of source pixels having a degree of non-linearity which is less than the non-linearity threshold amount. In the example shown in FIG. 7, pixel position corresponding to the sequence of input pixel values is plotted on the X axis, and pixel value on the Y axis.

FIG. 7 shows source pixels 100, 105, and 110 together with an interpolated pixel 115 which is output at the centre position 25 of the filter characteristic 10. It can be seen that the source pixels 100, 105, and 110 do not exhibit a significant degree of non-linearity because the source pixels 100, 105 and 110 exhibit a monotonic increase in pixel value. Here, the source pixel 100 will be detected as the minimum source pixel value, and the source pixel 110 will be detected as the maximum source pixel value. Consequently, the permissible output value range is set to correspond to the range between the minimum source pixel value and the maximum source pixel value because the source pixels in the test group do not satisfy either the first predetermined condition or the second predetermined condition as they exhibit a monotonic variation in pixel value. In the example shown, the interpolated output pixel 115 thus has a pixel value that lies within the permissible output value range and so no limiting is in fact needed.

As mentioned above, the test group of source pixels preferably comprises three source pixels. In this case, the proximate pixel value is selected to correspond to the middle (centre) source pixel in the sequence of the three source pixels in the test group. However, it will be appreciated that the test group need not comprise three source pixels, and may comprise two or more source pixels selected from a set of input source pixels.

Apparatus for implementing the above described methods will now be described with reference to FIG. 8.

Figure 8:
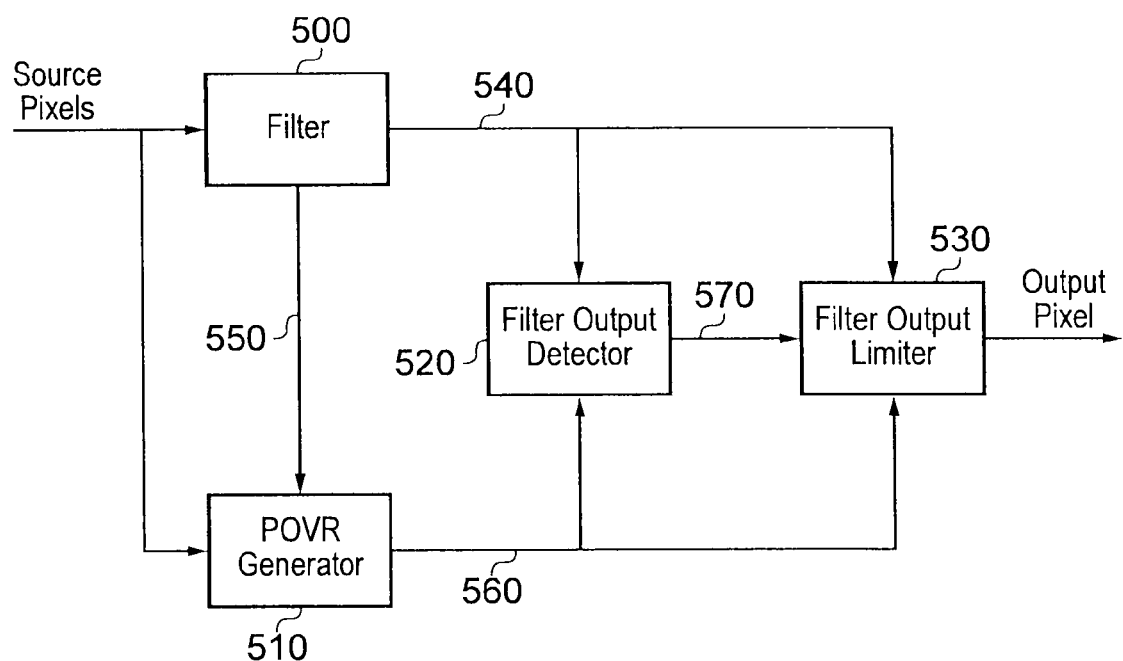
FIG. 8 is a schematic diagram of an apparatus for data processing in accordance with an embodiment of the present invention.

FIG. 8 is a schematic diagram of an apparatus for carrying out data processing in accordance with embodiments of the present invention as described above with reference to FIGS. 1 to 7. The apparatus comprises: a filter 500; a permissible output value range generator (POVR generator) 510; a filter output detector 520; and a filter output limiter 530.

The filter 500 is operable to receive source pixels from an image source such as an interlaced video image. In an embodiment of the invention, the filter comprises a sinc filter, although it will be appreciated that other suitable filters may be used. The filter 500 is operable to output an interpolated output pixel value 540 to the filter output detector 520 and the filter output limiter 530. Additionally, the filter 500 is operable to output filter data 550 to the POVR generator 510. The filter data comprises filter parameters such as the position of the filter with respect to the source pixels, and data relating to the envelope of the filter with respect to the source pixels.

The POVR generator 510 is operable to receive the source pixels from the source pixel source as well as the filter data 550 generated by the filter 500. In an embodiment, the POVR generator 510 generates the permissible output value range by detecting pixel values which correspond to source pixels within the central lobe of the filter as defined by the envelope of the filter about the centre position i.e. between the envelope of the filter coefficients surrounding the interpolated output pixel position and the X axis.

In an embodiment, the POVR generator 510 is also operable to generate the test group of pixel values. In this embodiment, the POVR generator 510 is operable to process the source pixels as described above with reference to FIG. 4 and the steps S210 and S230 so as to detect whether the test group exhibits a degree of non-linearity which is greater than the non-linearity threshold amount. In other words, the POVR generator 510 is operable to detect whether the test group satisfies the first predetermined condition and the second predetermined condition and modify the permissible output value range accordingly as described above with reference to FIG. 4.

Additionally, the POVR generator 510 is operable to output the permissible output value range as permissible output value range data 560 to the filter output detector 520 and the filter output limiter 530.

The filter output detector 520 is then operable to detect whether the interpolated output pixel value 540 received from the filter 500 is outside the permissible output value range. Accordingly, the filter output detector 520 carries out a comparison between the interpolated output pixel value 540 and the permissible output value range data 560 received from the POVR generator 510 so as to generate filter output data 570 which indicates whether the output of the filter should be limited to lie within the permissible output value range. The filter output data 570 is output by the filter output detector 520 to the filter output limiter 530.

The filter output limiter 530 is operable to limit the output of the filter in dependence upon the filter output data 570 and the permissible output value range data 560. If the filter output data 570 indicates that the interpolated output pixel value 540 is within the permissible output value range, then the interpolated output pixel value is output as an output pixel by the filter output limiter 530. However, if the filter output data 570 indicates that the interpolated output pixel value 540 is outside the permissible output value range, then the filter output limiter 530 is operable to limit the interpolated output pixel value 540 so that it lies within the permissible output value range as indicated by the permissible output value range data 560 received from the POVR generator 510. The filter output limiter 530 then generates the output pixel accordingly.

As described above, embodiments of the present invention detect whether pixels surrounding the input pixel exhibit a degree of non-linearity which is greater than a non-linearity threshold amount and limit the output of the filter accordingly. However, in some situations, image artefacts may be introduced into the image by limiting the output of the filter so that the output value lies within the source pixel value range as described above.

For example, this may occur with an input image comprising three parallel lines which form a shallow angle to the horizontal, in which the parallel lines are arranged so that there are two darker lines either side of a lighter line. If a large horizontal scaling factor is applied to this image, the lines may develop stepped features such that some parts of the darker and lighter lines may merge together. This means that some groups of test pixels will not satisfy either of the two predetermined conditions because they exhibit a degree of non-linearity which is greater than a non-linearity threshold and thus the output value will be limited (clipped) to lie within the source pixel value range as defined by the central lobe 50 as described above with reference to FIG. 2. Therefore, at these pixel positions, the image may not be represented correctly because the lighter line is unlikely to be shown correctly as being between the two darker lines.

Therefore, embodiments of the present invention reduce the occurrence of these types of image artefacts by applying the tests described above with reference to FIGS. 4, 5 and 6 above to other pixels which surround the interpolated pixel position. Additionally, to address this problem, embodiments of the present invention carry out neighbourhood checks on pixels surrounding a pixel under test to try and ensure that the interpolated output value of the interpolated pixel is consistent with neighbouring pixels. This will be described in more detail below with reference to FIGS. 9, 10, 11A-D, 12, and 13.

Figure 9:
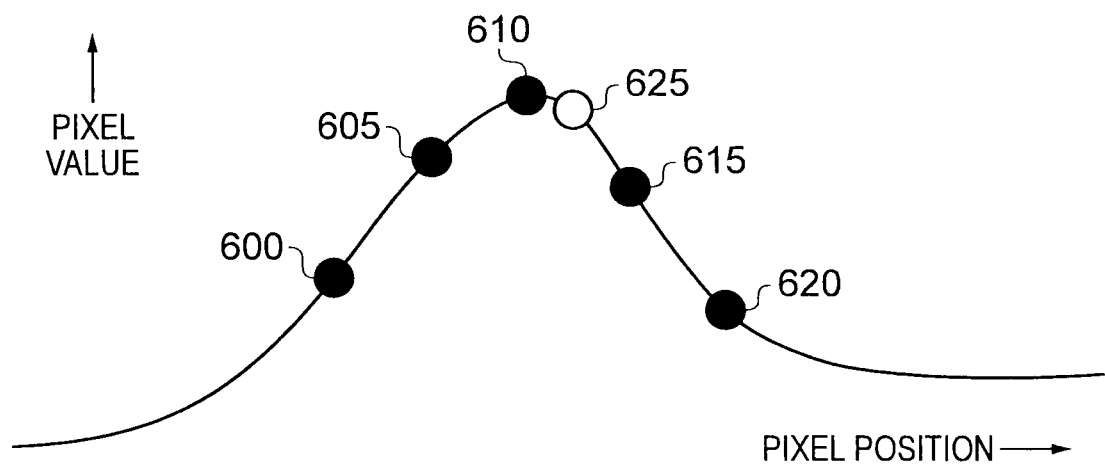
FIG. 9 is a schematic diagram of an interpolated pixel with respect to source pixels which surround the interpolated pixel and exhibit a degree of non-linearity which is greater than a non-linearity threshold amount in accordance with an embodiment of the present invention.

FIG. 9 is a schematic diagram of an interpolated pixel with respect to source pixels which surround the interpolated pixel and exhibit a degree of non-linearity which is greater than a non-linearity threshold amount. In particular, FIG. 9 shows source pixels 600, 605, 610, 615, and 620 together with an interpolated pixel 625.

As described above with reference to FIG. 5, if equation 1 (or alternatively, equation 2) is satisfied then MAX_VAL is modified to correspond to the maximum output value of the filter (i.e. 255 in the present example). In an embodiment, the POVR generator 510 is operable to detect whether a filter coefficient corresponding to a pixel adjacent to the interpolated pixel position (e.g. the coefficient associated with the source pixel 615 in FIG. 9) is within a predetermined coefficient threshold with respect to the coefficient associated with the proximate pixel (e.g. the source pixel 610 in FIG. 9). If the coefficient associated with an adjacent pixel is within the predetermined coefficient threshold and a zooming operation is to be carried out, then equation 1 (or alternatively equation 2) is also applied to the pixel values of the source pixels in the neighbourhood of the interpolated pixel as described below. Typically, the predetermined coefficient threshold is 90 percent of the coefficient associated with the proximate pixel, although it will be appreciated that any other suitable value could be used.

As mentioned above, in embodiments in which zooming is to be carried out, as well as detecting whether the two source pixels to the left of the interpolated pixel together with the source pixel to the right of the interpolated pixel (for example source pixels 605, 610, and 615 surrounding the interpolated pixel 625) satisfy equation 1, the POVR generator 510 is also operable to detect whether the pixel values of one source pixel to the left of the interpolated pixel and two source pixels to the right of the interpolated pixel (for example, source pixels 610, 615, and 620 surrounding the interpolated pixel 625) satisfy equation 1 if the coefficient associated with the adjacent pixel is within the predetermined coefficient threshold with respect to the coefficient associated with the proximate pixel.

For example, with reference to FIG. 9 and equation 1 above, a corresponds to the pixel value of the source pixel 610, b corresponds to the pixel value of the source pixel 615, and c corresponds to the pixel value of the source pixel 620. In other words, in this case, the proximate pixel value is taken to be that which corresponds to a centre source pixel of a group of three source pixels under test. If equation 1 (or alternatively equation 2) is satisfied for either the test group of source pixels 605, 610, and 615, or the test group of pixels 610, 615, and 620, then MAX_VAL is modified to correspond to the maximum output value of the filter (i.e. 255 in the present example).

The above test with respect to the source pixels and equations 1 and 2 is repeated for the same source pixels in respect of equations 3 and 4 in a similar way, and, if equation 3 (or alternatively equation 4) is satisfied, then MIN_VAL is set accordingly as described above with reference to FIG. 6.

In an embodiment, if the image data is to be scaled so that the image is shrunk in size either vertically, horizontally, or both, then the three source pixels to the left of the interpolated pixel are also tested to see whether they satisfy equations 1 and 3 (or equations 2 and 4 respectively) and MAX_VAL and MIN_VAL modified accordingly. In the example shown in FIG. 9, a is taken to correspond to the pixel value of the source pixel 600, b is taken to correspond to the pixel value of the source pixel 605, and c is taken to correspond to the pixel value of the source pixel 610. In other words, the POVR generator 510 detects whether equations 1 and 3 (or alternatively 2 and 4) are satisfied for a plurality of test groups of source pixels surrounding the interpolated pixel and modifies the permissible output value range accordingly. Here, it will be appreciated that it is the test groups that surround the interpolated pixel and that the source pixels in the test groups needn't necessarily surround the interpolated pixel.

It will be appreciated that the above test could be applied for other suitable arrangements of source pixels such as an arrangement in which an interpolated pixel position corresponding to the interpolated pixel 625 is to the left of the source pixel 610 with the grouping of different test groups of 3 source pixels being arranged accordingly.

In addition to detecting whether the equations described with reference to FIGS. 5 and 6 are satisfied as described above, in some embodiments, the output of the filter is limited to be a mixture of the interpolated output pixel value generated by the filter 500 with the value of the interpolated output pixel value after it is limited to lie within the permissible output value range (i.e. a weighted average of the interpolated value and the appropriate one of the MAX_VAL and MIN_VAL).

In embodiments of the present invention, the pixels surrounding a pixel under test are tested using a neighbourhood test (described in more detail below) to determine whether the output pixel values should be mixed so that the resultant output pixel value is consistent with neighbouring output pixel values. Accordingly, the output sample value as generated at the step S130 described above with reference to FIG. 3 may be modified in accordance with the outcome of the neighbourhood test. Typically, a 3×3 neighbourhood test group of pixels comprising the pixel under test is used, although it will be appreciated that other suitable arrangements of neighbourhood test group could be used. The neighbourhood test is described in more detail below with reference to FIGS. 10, 11A-D, 12, and 13.

In the following description, the following values will be referred to so as to simplify understanding of the neighbourhood test in accordance with embodiments of the present invention:

i—interpolated output pixel value as generated by the filter 500;

MIN_VAL—as defined above for the pixel under test;

MAX_VAL—as defined above for the pixel under test;

ClippedValue—the interpolated output pixel value when limited (clipped) to lie within the permissible output value range (i.e. the interpolated output pixel value i limited to lie between MIN_VAL and MAX_VAL).

Figure 10:
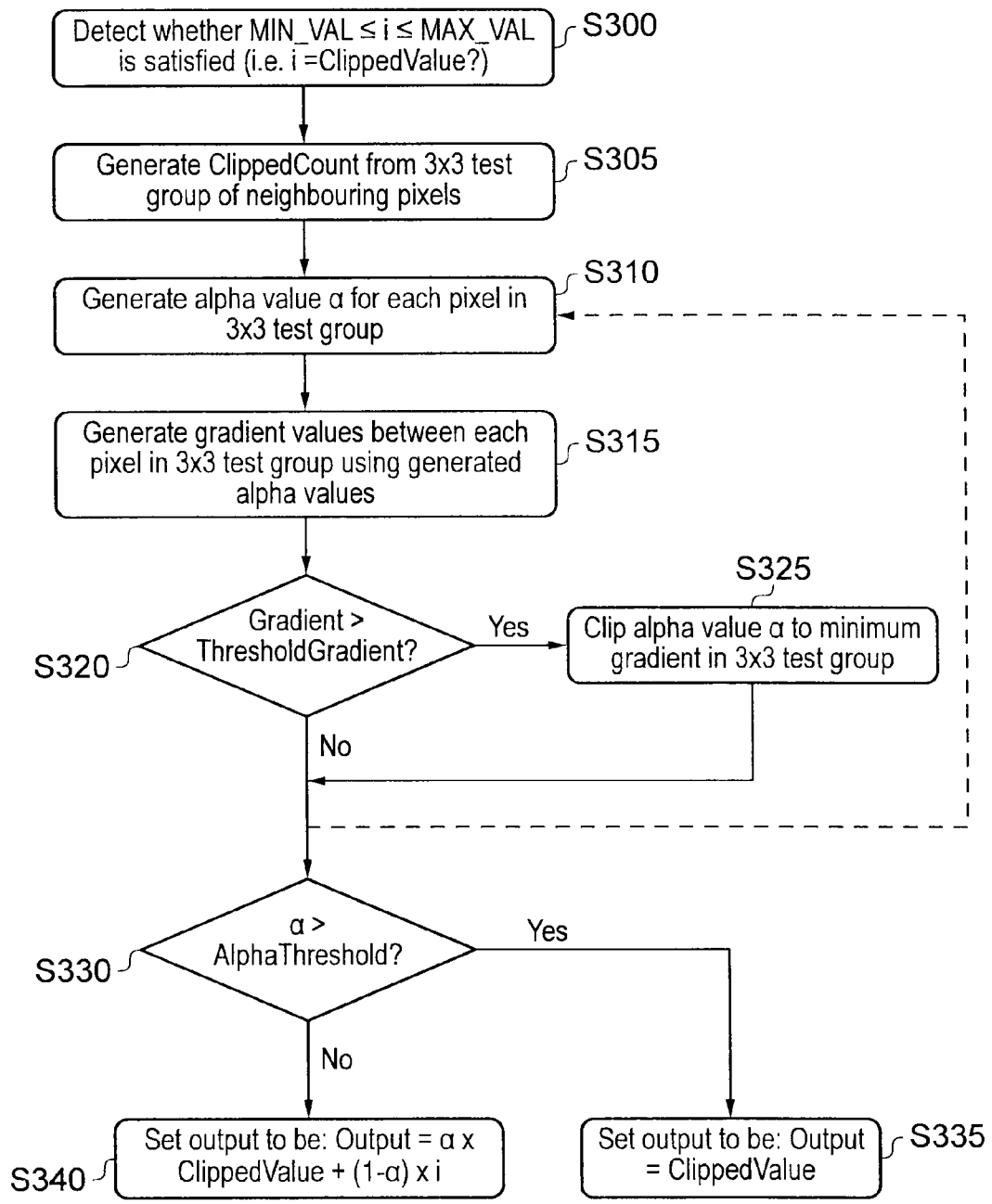
FIG. 10 is a flowchart showing a method of carrying out a neighbourhood check in accordance with an embodiment of the present invention.

FIG. 10 is a flowchart showing a method of carrying out a neighbourhood test in accordance with embodiments of the present invention.

At a step S300, each output sample value in the image generated as a result of the step S130 as described above is checked to detect whether the interpolated output pixel value lies within a range:

$$\text{MIN\_VAL} \leq i \leq \text{MAX\_VAL} \qquad \text{equation 5.}$$

The value (ClippedValue) for the pixel under test is assigned to that pixel together with a flag, ValueWasClipped, indicating whether or not the interpolated output pixel value i satisfies equation 5. If equation 5 is satisfied, then ValueWasClipped is set to FALSE (0). However, if equation 5 is not satisfied, then ValueWasClipped is set to TRUE (1).

Then, at a step S305, the POVR generator 510 cooperates with the filter output detector 520 and the filter output limiter 530 to count up the number of pixels in a 3×3 pixel neighbourhood centred on the pixel under test for which ValueWasClipped is TRUE. Examples of 3×3 pixel neighbourhoods are illustrated in FIGS. 11A to 11D. The number of pixels in the 3×3 pixel neighbourhood which have ValueWasClipped=TRUE is termed ClippedCount. For example, if every pixel in the 3×3 pixel neighbourhood has ValueWasClipped=TRUE, then ClippedCount=9. The ClippedCount value is used to generate a mixing value which can be used to modify the output sample value of the pixel under test. This will be described in more detail below.

To provide an empirically better result in the processing to be described below, it is sometimes desirable to set ClippedCount=0, even if some pixels in the 3×3 pixel neighbourhood have ValueWasClipped=TRUE. For example, if the pixel under test is next to an area of pixels for which MAX_VAL and/or MIN_VAL have been modified to correspond to the maximum output range of the filter (i.e. those pixels have been allowed to ring), then it is likely that MAX_VAL and/or MIN_VAL for the pixel under test should also be set to correspond to the maximum output range of the filter (i.e. allowed to ring).

FIGS. 11A to 11D illustrate examples of 3×3 pixel neighbourhoods for which ClippedCount is set to zero even if the 3×3 pixel neighbourhood comprises several pixels for which ValueWasClipped=TRUE. For example, FIG. 11A shows neighbourhood test group 700 of 3×3 pixels (totaling 9 pixels) which comprises a pixel under test 705 at the centre of the neighbourhood test group. In the example shown in FIG. 11A, the number of pixels for which ValueWasClipped=TRUE is five and therefore ClippedCount should be 5. However, the actual value of ClippedCount is set to be zero because there is an area of the neighbourhood test group for which ValueWasClipped=FALSE as shown by the column of zeroes in the left hand pixels of FIG. 11A, indicating that the pixel under test 705 is next to an image region which was allowed to ring (or exhibits a monotonic variation in pixel value).

In embodiments of the present invention, the POVR generator 510 sets the ClippedCount to zero if it detects that there is a horizontal or vertical group of three pixels in the neighbourhood test group for which ValueWasClipped=FALSE. FIGS. 11B to 11D show further examples of neighbourhood test groups for which ClippedCount is set to zero.

FIG. 11B illustrates a neighbourhood test group having a ClippedCount of 4 but, because there is a horizontal group of three pixels at the top of the group, the ClippedCount will be set to zero. FIG. 11C illustrates a neighbourhood test group having a ClippedCount of 3 but, because there is a horizontal group of three pixels at the centre of the group, the ClippedCount will be set to zero. FIG. 11D illustrates a neighbourhood test group having a ClippedCount of 4 but, because there is a horizontal group of three pixels and a vertical group of three pixels running through the centre of the group, the ClippedCount will be set to zero. It will be appreciated that there are pixel arrangements other than the examples shown FIGS. 11A to 11D for which ClippedCount will be set to zero. Furthermore, it will be appreciated that any other appropriate method of generating the ClippedCount value could be used.

At a step S310, an alpha value α for each pixel in the neighbourhood test group is generated by the POVR generator 510 in cooperation with the filter output detector 520 and the filter output limiter 530. In embodiments of the present invention, the alpha value is generated according to:

$$\alpha = \text{MIN}(1.0, \text{ClippedCount}/\text{ClippedCountThreshold}) \qquad \text{equation 6}$$

where ClippedCount is generated at the step S310 and ClippedCountThreshold is a predetermined threshold. In an embodiment, ClippedCountThreshold=8, although it will be appreciated that any other suitable value could be used. For example, if the ClippedCount value for that pixel is 9, then α=1.0, according to equation 6 above. As another example, if ClippedCount=5, then α=0.625, according to equation 6 above. If ClippedCount=0, then α=0.

Where each pixel has a plurality of colour components, α is calculated for each colour component. In an embodiment, the alpha value α for each colour component is generated by the POVR generator 510 in cooperation with the filter output detector 520 and the filter output limiter 530 using the respective ClippedCount value associated with that colour component. In another embodiment, the POVR generator 510 is operable to cooperate with the filter output detector 520 and the filter output limiter 530 so as to detect a minimum ClippedCount value from the ClippedCount values of the colour components associated with the pixel under test. The minimum ClippedCount value of the colour components associated with the pixel under test is then used to generate the alpha value α for that pixel. These embodiments can be selected by a user as appropriate or pre-selected within software.

Figure 12:
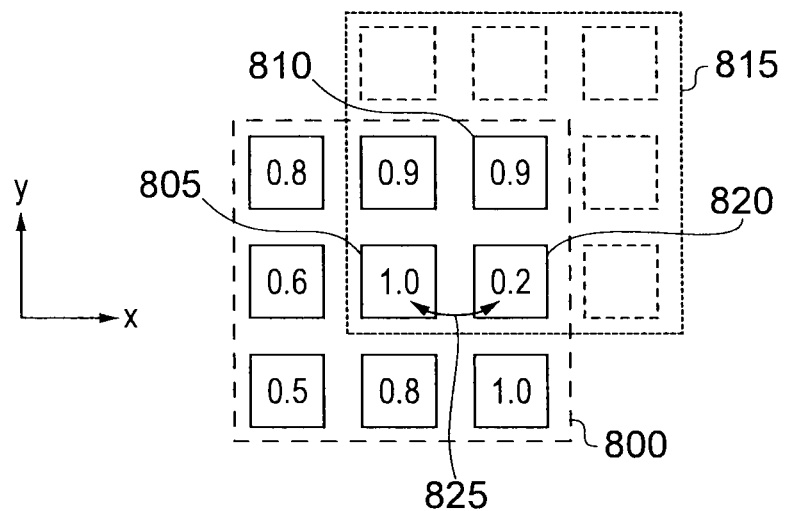
FIG. 12 is a schematic diagram of calculated alpha values for pixels surrounding an interpolated pixel in accordance with an embodiment of the present invention.

An example of alpha values associated with pixels within a neighbourhood test group is illustrated in FIG. 12. FIG. 12 shows a neighbourhood test group 800 of pixels (indicated by the heavy dashed line) which is associated with a pixel under test 805. The alpha values for each pixel in the neighbourhood test group 800 are shown rounded to one decimal place, although it will be appreciated that a greater resolution value or the full floating point value calculated for the alpha value α may be stored and used by the POVR generator 510 for other calculations.

As an example of the generation of an alpha value α, consider a pixel 810 within the neighbourhood test group 800. The ClippedCount value for the pixel 810 is generated from a neighbourhood test group 815 (indicated by the dotted line) according to the process described above for the step S305.

The alpha value α for the pixel 810 is then generated accordingly as described above.

At a step S315, the alpha value α of the pixel under test is compared with the alpha values of the other pixels in the neighbourhood test group associated with the pixel under test so as to try and ensure a smooth transient between neighbouring alpha values. Therefore, at the step S315, the POVR generator 510 generates gradient values between the pixel under test and each neighbouring pixel according to:

$$\text{ThisGrad} = (dx + dy) \times \text{AllowedGradient} + \text{TestNeighbourAlpha} \quad \text{equation 7}$$

where ThisGrad is the gradient between the pixel under test (centre pixel of the neighbourhood test group) and a neighbouring pixel, dx and dy are the absolute values of the offset position of the neighbouring pixel with respect to the pixel under test, AllowedGradient is a constant that may be user defined or preset within software, and TestNeighbourAlpha is the alpha value α of the neighbouring pixel. In an embodiment, AllowedGradient=0.5 although it will be appreciated that any other suitable value could be used.

An illustration of a calculation of ThisGrad will now be described with reference to FIG. 12. In this example, ThisGrad is calculated between the pixel under test 805 and a neighbouring pixel 820 as indicated by a double-headed arrow 825. In this case, the alpha value of the neighbouring pixel is 0.2 and therefore TestNeighbourAlpha=0.2. Additionally, dx=1 and dy=0 because the neighbouring pixel 820 is one pixel position to the right of the pixel under test 805. Therefore, ThisGrad=(1+0)×0.5+0.2=0.7.

The calculation of ThisGrad is carried out by the POVR generator 510 for each neighbouring pixel. For the avoidance of doubt, "neighbouring pixel" is taken to refer to those pixels which surround the pixel under test and are adjacent to the pixel under test (i.e. the centre pixel of the neighbourhood test group), either horizontally, vertically, or diagonally.

Then, at a step S320, the POVR generator 510 cooperates with the filter output detector 520 and the filter output limiter 530 to detect whether any of the calculated values of ThisGrad associated with each neighbouring pixel exceed a threshold gradient (represented as ThresholdGradient in the step S320 of FIG. 10). In other words the POVR generator 510 detects whether ThisGrad>ThresholdGradient for each neighbouring pixel. Typically, the threshold gradient is set to be equal to AllowedGradient as defined above, although it will be appreciated that any other suitable value could be used.

If any of the values of ThisGrad is greater than the value ThresholdGradient for any neighbouring pixel, then, at a step S325, the POVR generator 510 is operable to cooperate with the filter output detector 520 and the filter output limiter 530 so as to detect a minimum ThisGrad value from the gradient values calculated for each neighbouring pixel in the neighbourhood test group. The POVR generator 510 then sets the alpha value of the pixel under test set to correspond to the detected minimum ThisGrad value.

Figure 13:
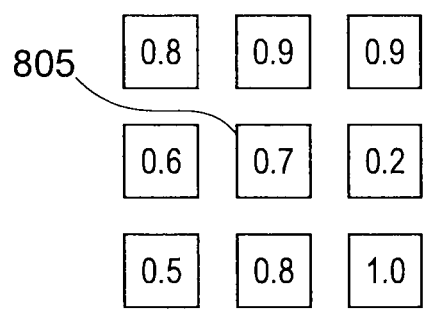
FIG. 13 is a schematic diagram of calculated alpha values for pixels surrounding an interpolated pixel in which a central alpha value has been limited in accordance with an embodiment of the present invention.

An example of limiting the alpha value to correspond to the detected minimum ThisGrad value is illustrate in FIG. 13. FIG. 13 shows the neighbourhood test group 800 of FIG. 12 in which the alpha value of the pixel under test has been set to be α=0.7 because this is the lowest ThisGrad value for the neighbourhood test group 800. If the value of ThisGrad is not greater than the value of ThresholdGradient for any neighbouring pixel, then the alpha value for the pixel under test which was calculated at the step S310 is used as the alpha value for the pixel under test.

Figure 14:
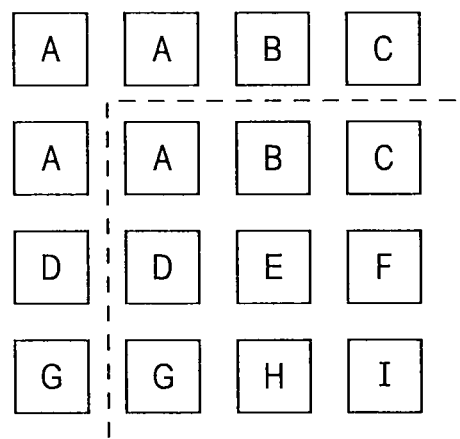
FIG. 14 is a schematic diagram of pixels at an edge of an image in which neighbouring pixel values have been used for the edge pixels in accordance with an embodiment of the present invention.

The steps S310 to S325 are then repeated as appropriate as indicated by the dashed line in FIG. 10 for each pixel in the scaled image together with the associated neighbourhood test group. When the pixel under test is not surrounded by a 3×3 pixel neighbourhood (for example at edges of the image where the pixels are not completely surrounded by other pixels), the source pixel values and/or alpha values for edge pixels are taken to be the same as that of an adjacent pixel. In other words, the source pixel values and/or alpha values are repeated with respect to neighbouring pixels. An example of this is illustrated in FIG. 14 which is a schematic diagram of pixels at an edge of an image in which neighbouring pixel values have been used for the edge pixels. The dashed line in FIG. 14 indicates where edges of the source image occur.

To generate an output value for each pixel, at a step S330, the alpha value generated at either the step S320 or the step S325 as appropriate is compared to an alpha threshold value, AlphaThreshold, by the POVR generator 510. In an embodiment, AlphaThreshold=ClippedCountThreshold/9, although it will be appreciated that other suitable alpha threshold values could be used.

If α is greater than AlphaThreshold (α>AlphaThreshold), then, at a step S335, the output value is set by the filter output limiter 530 to correspond to the clipped value corresponding to that output pixel. In other words, Output=ClippedValue and the output pixel value is set to be the interpolated output pixel value when limited (clipped) to lie within the permissible output value range as described above with reference to FIGS. 2 to 8.

However, if the alpha value of that pixel is not greater than the alpha threshold value, then, at a step S340, the clipped value of the interpolated pixel is mixed with the interpolated output pixel value i as generated by the filter 500 according to:

$$\text{Output} = \alpha \times \text{ClippedValue} + (1-\alpha) \times i \quad \text{equation 8}$$

where α is the alpha value calculated at the steps S320 or S325 as appropriate, and ClippedValue and i are defined above. In other words, the alpha value can be considered to be a mixing value and the output value generated at the step S340 can be considered to be a linear mix of a clipped output value and an unclipped interpolated output pixel value which are mixed according to the mixing value α.

Therefore, it can be seen that the steps S330 to S340 are carried out so as to detect, for each output sample value, whether the output of the filter was limited to lie within the permissible output value range. The output sample values for which the output of the filter was limited to lie within the permissible output value range can be considered to be clipped output values, and those output sample values for which the output of the filter was not limited to lie within the permissible output value range can be considered to be unclipped output values. The mixing value (alpha value α) is then derived from the neighbourhood test group in dependence upon a respective number of clipped output values and unclipped output values in the neighbourhood test group. The output sample value for the pixel under test is then modified in dependence upon the mixing value derived from the neighbourhood test group.

In this way, ringing artefacts in an interpolated output image may advantageously be reduced, whilst artefacts caused by limiting the interpolated output pixel value to the permissible output value range can also be reduced because neighbouring pixels can be taken into account when determining whether the current output value should be clipped.

It will be appreciated that the apparatus shown in FIG. 8 may be implemented as a field programmable data array (FPGA) or a application specific integrated circuit (ASIC), although other forms of hardware may be used. Furthermore, it will be appreciated that the above described apparatus and method needs not be used to process image pixels but may be used to carry out data processing on other sample values such as audio samples.

It will be appreciated that in embodiments of the present invention, elements of the method may be implemented in a computing device in any suitable manner. Thus the required adaptation to existing parts of a conventional equivalent device may be implemented in the form of a computer program product comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

We claim:

1. A method of data processing using a processor, said method comprising:
   using the processor to
   apply a filter to an input sample set including sample values selected from an input sequence of input sample values to generate a corresponding output sample value having an output sample value position with respect to said input sample set, said filter having a maximum output range;
   derive a permissible output value range from an input group of two or more input sample values in said input sample set which surround said output sample value position;
   detect whether an output of said filter is outside said permissible output value range; and
   limit said output of said filter to lie within said permissible output value range when the output of said filter is outside said permissible output value range.

2. A method according to claim 1, comprising:
   using the processor to
   detect an attribute of said input sample values in said input group; and
   set said permissible output value range in dependence upon said detection of said attribute of said input sample values in said input group.

3. A method according to claim 1, comprising:
   using the processor to
   detect, within said input group, a maximum input sample value and a minimum input sample value;
   derive an input sample value range from said detected maximum input sample value and said detected minimum input sample value; and
   set said permissible output value range to correspond to said input sample value range.

4. A method according to claim 3, wherein
   said input group includes a test group of input sample values selected from said input group; and
   said method comprises:
   using the processor to
   detect whether said test group of input sample values exhibits a degree of non-linearity greater than a non-linearity threshold; and
   modify said permissible output value range in dependence upon said detection of whether said test group of input sample values exhibits a degree of non-linearity greater than the non-linearity threshold.

5. A method according to claim 4, wherein, when said test group of input sample values is detected as exhibiting a degree of non-linearity greater than said non-linearity threshold, said method sets said permissible output value range so that said permissible output value range is greater than said input sample value range, subject to said maximum output range of said filter.

6. A method according to claim 5, wherein
   said maximum output range of said filter includes a maximum output sample value which defines an upper limit of said maximum output range;
   said permissible output value range includes a first value which defines an upper limit of said permissible output value range; and
   said method comprises:
   using the processor to
   detect whether said test group of input sample values satisfies a first predetermined condition, and
   modify said permissible output value range so that said first value corresponds to said maximum output sample value of said filter when said test group of input sample values satisfies said first predetermined condition.

7. A method according to claim 5, wherein
   said maximum output range of said filter includes a minimum output sample value which defines a lower limit of said maximum output range;
   said permissible output value range includes a second value which defines an lower limit of said permissible output value range; and
   said method comprises:
   using the processor to
   detect whether said test group of input sample values satisfies a second predetermined condition, and
   modify said permissible output value range so that said second value corresponds to said minimum output sample value of said filter when said test group of input sample values satisfies said second predetermined condition.

8. A method according to claim 6, wherein
   said test group of input sample values includes a proximate input sample value which is nearest to said output sample value position; and
   said method comprises:
   using the processor to
   derive an average input sample value from said input sequence of input sample values, said average input sample value being derived from input sample values in said test group excluding said proximate input sample value.

9. A method according to claim 8, wherein said detection of whether said test group satisfies said first predetermined condition includes:
   detecting whether said average input sample value is less than a first predetermined sample value,
   wherein said first predetermined condition is satisfied when said average input sample value is less than said first predetermined sample value minus an adjustment value derived from said pixel values in said test group.

10. A method according to claim 9, wherein said first predetermined sample value includes said proximate input sample value.

11. A method according to claim 8, wherein said detection of whether said test group satisfies said second predetermined condition includes:
    detecting whether said average input sample value is greater than a second predetermined sample value, wherein said second predetermined condition is satisfied when said average input sample value is greater than said second predetermined sample value plus said adjustment value derived from said pixel values in said test group.

12. A method according to claim 1, wherein said second predetermined sample value includes said proximate input sample value.

13. A method according to claim 9, wherein said adjustment value includes a first predetermined numerical factor plus a second predetermined numerical factor multiplied by said absolute pixel value range of said pixels in said test group.

14. A method according to claim 8, comprising:
using the processor to
detect whether any input sample values adjacent to said output sample value position are a same distance from said output sample value position as other input sample values adjacent to said output sample value position; and
select one of said adjacent input sample values as said proximate input sample value when any said input sample values adjacent to said output sample value position are the same distance from said output sample value position as other said input sample values adjacent to said output sample value position.

15. A method according to claim 4, wherein said method is carried out for a plurality of said test groups of input sample values selected from said input group.

16. A method according to claim 1, wherein said method is carried out on said input sample set to generate an output sample set including a plurality of output sample values, and said method comprises:
using the processor to
detect, for each output sample value, whether said output of said filter was limited to lie within said permissible output value range, whether output sample values for which said output of said filter was limited to lie within said permissible output value range are clipped output values, and whether output sample values for which said output of said filter was not limited to lie within said permissible output value range are unclipped output values;
derive a mixing value from a neighborhood test group of output sample values selected from said output sample set, said neighborhood test group being associated with a output sample under test and said mixing value being derived in dependence upon a respective number of clipped output values and unclipped output values in said neighborhood test group; and
modify said output sample value of said output sample under test in dependence upon said mixing value derived from said neighborhood test group.

17. A method according to claim 1, wherein
said filter includes an image filter; and
said input sample set includes image input pixels.

18. A non-transitory computer-readable storage medium storing computer-readable instructions that, when executed by a computer, cause the computer to perform a method in accordance with claim 1.

19. An apparatus for data processing, said apparatus comprising:
a processor including:
a filtering element configured to apply a filter to an input sample set including sample values selected from an input sequence of input sample values to generate a corresponding output sample value having an output sample value position with respect to said input sample set, said filter having a maximum output range;
a deriver configured to derive a permissible output value range from an input group of two or more input sample values in said input sample set which surround said output sample value position;
a detector configured to detect whether said output of said filter is outside said permissible output value range; and
a limiter configured to limit said output of said filter to lie within said permissible output value range when said detector detects that said output of said filter is outside said permissible output value range.

* * * * *